United States Patent [19]

Moen

[11] 4,330,011
[45] May 18, 1982

[54] FAUCET VALVE WITH EARLY SHUTOFF

[75] Inventor: Alfred M. Moen, Grafton, Ohio

[73] Assignee: Stanadyne, Inc., Windsor, Conn.

[21] Appl. No.: 161,049

[22] Filed: Jun. 19, 1980

[51] Int. Cl.³ .............................................. F16K 11/02
[52] U.S. Cl. ................................ 137/625.17; 251/210; 137/614.11
[58] Field of Search ....................... 137/625.17, 614.11, 137/614.12; 251/210

[56] References Cited

U.S. PATENT DOCUMENTS

| | | | |
|---|---|---|---|
| 3,285,278 | 11/1966 | Corlett | 137/625.17 X |
| 3,428,086 | 2/1969 | Glasgow | 251/210 X |
| 3,730,222 | 5/1973 | Moen | 137/625.17 |
| 3,840,048 | 10/1974 | Moen | 137/625.41 |
| 4,033,373 | 7/1977 | Manoogian et al. | 137/625.17 X |

*Primary Examiner*—William R. Cline
*Attorney, Agent, or Firm*—Kinzer, Plyer, Dorn & McEachran

[57] ABSTRACT

A mixing valve includes a sleeve with axially spaced inlet and outlet ports and a valve member movable within the sleeve to control flow from the inlet to the outlet. There is a seal at the inlet port, which seal extends through the sleeve and into contact with the valve member. The valve member has a first portion adjacent the inlet port to control flow of the fluid therethrough and a second portion adjacent the outlet port to similarly control flow of fluid therethrough. The first and second valve member portions are spaced apart a distance such that movement of the valve member toward a closing position causes the second portion to close the oulet port before the first portion closes the inlet port thereby reducing pressure on said seal means at closure of said inlet port.

5 Claims, 5 Drawing Figures

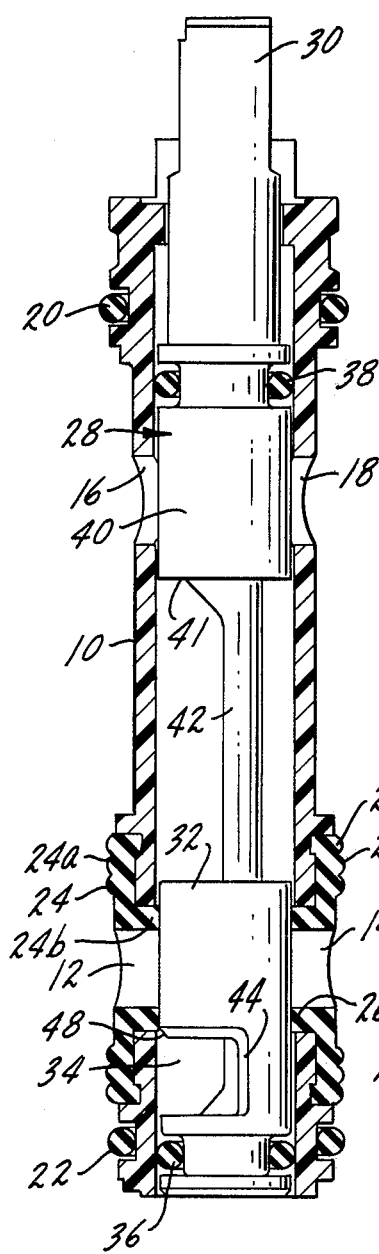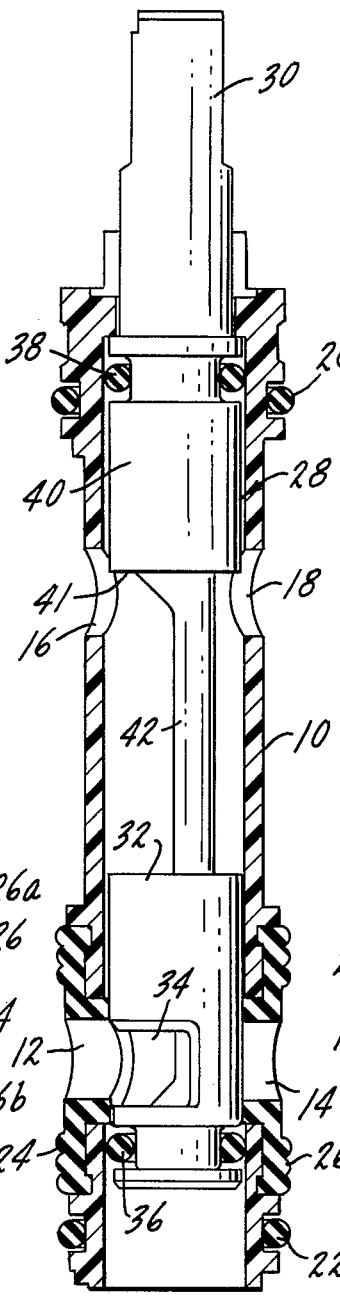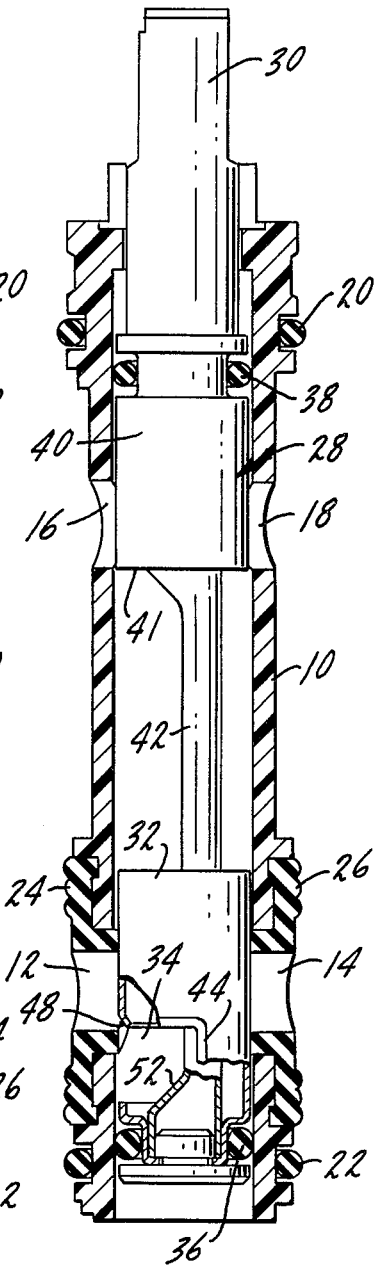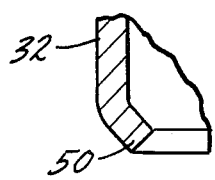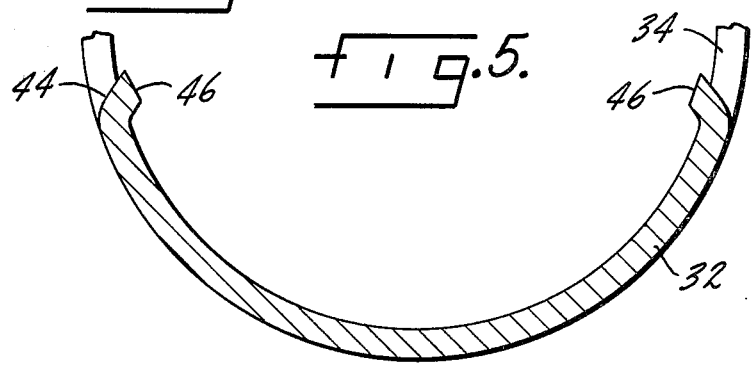

_4,330,011_

FAUCET VALVE WITH EARLY SHUTOFF

SUMMARY OF THE INVENTION

The present invention relates to a mixing valve of the type utilizing a reciprocal valve member to control flow of fluid between the inlet and outlet ports of a surrounding sleeve. In particular, the invention is concerned with preventing damage to the seal members at the inlet port. This is accomplished by providing for valve closure at the sleeve outlet port just prior to closure at the sleeve inlet port thereby reducing the pressure upon the inlet port seal means at valve closure.

A primary purpose of the invention is a mixing valve of the type described in which the reciprocally and rotatably movable valve member has portions positioned to provide closure at both the inlet ports and the outlet ports with the outlet port closure being arranged to take place just prior to closure at the inlet ports.

Another purpose is a structure of the type described including means for preventing damage to the inlet port seal members at valve closure.

Other purposes will appear in the ensuing specification, drawings and claims.

BRIEF DESCRIPTION OF THE DRAWINGS

The invention is illustrated diagrammatically in the following drawings wherein:

FIG. 1 is a partial axial section through a mixing valve of the type described showing the valve in a closed position, FIG. 2 is an axial section similar to FIG. 1, but showing the valve in an open position, FIG. 3 is a similar axial section showing the valve just prior to closure, FIG. 4 is an enlarged partial section illustrating a portion of the valve member which performs the valve closing function, and FIG. 5 is a similar enlarged view showing a further portion of the valve member.

DESCRIPTION OF THE PREFERRED EMBODIMENT

The present invention relates to mixing valves, for example of the type generally shown in my prior U.S. Pat. No. 3,840,048. In a valve construction of this type there is what is known as a grommet type of seal which is positioned on the exterior of a sleeve and extends through the sleeve inlet port and into contact with a valve member reciprocally and rotatably movable within the sleeve. The valve member controls the flow of water through the valve structure. Such valve members are customarily found in kitchen, lavatory and shower-tub installations within a home. Because of the high pressures upon the grommet type of seal at the time of valve closure there has been a tendency for the valve member, when closing, to nip or cut or in some way abrade the seal member at shutoff. In time this will cause the seal to become leaky and thus the valve to become unsatisfactory. The present invention is specifically directed to reducing the high pressures upon this type of seal at the instant of closing. This is accomplished by providing a preclosure or early shutoff at the outlet port thereby reducing the pressures applied on the seal at the inlet at the time of complete valve closure.

The invention will be described in connection with a specific type of valve structure which has become known in the trade as a valve cartridge. It is a completely contained unit which is positioned within a faucet or plumbing housing. The invention should not be limited to this specific structure. In like manner, the particular cartridge shown is one in which the valve member is pulled out to open the valve and pushed in for valve closure. The concepts disclosed herein are similarly applicable to a valve structure which is pushed in to open and pulled out for closure.

As illustrated in FIGS. 1–3, the valve cartridge includes a sleeve 10 having a pair of inlet ports 12 and 14 which will conventionally be connected to hot and cold water supplies. There are outlet ports 16 and 18 in the sleeve and these ports will conventionally connect to a spout or other type of discharge device. The sleeve may have grooves containing seal rings 20 and 22 which will be in sealing contact with the interior of the faucet or plumbing housing.

The inlet ports 12 and 14 include identical seal members 24 and 26 which may be of the type shown in my above-mentioned U.S. patent. Such seal members include body portions 24a and 26a, respectively, and port seal portions 24b and 26b, respectively, which port seal portions extend inwardly through the inlet ports and into sealing contact with the interior valve member.

The valve member is indicated generally at 28 and includes a stem portion 30 which extends outwardly through the sleeve and will conventionally mount a handle or other operating device. The inward end of the valve member includes a piston structure 32 which is hollow and which includes a notch 34 selectively movable into register with inlet ports 12 and 14 to control the flow of water therethrough. There is an interior seal ring 36 which is in sealing contact with the inside of sleeve 10, thus preventing leakage at the interior end of the valve. In like manner, there is a seal ring 38 at the outward end of valve member 28 which prevents leakage outwardly from the valve cartridge along the stem portion 30.

The valve member 28 includes an outlet port closure portion 40 which is generally cylindrical in shape and which will have an exterior diameter marginally less than the interior diameter of sleeve 10. This difference in diameters is somewhat exaggerated in the drawings for purposes of illustration. Cylindrical portion 40 will have a minimum clearance fit within the sleeve and will be effective to substantially close off the outlet ports 16 and 18 as described hereinafter. Cylindrical portion 40 is solid, whereas, the piston portion 32 is hollow. The two portions are joined together by a stem assembly 42.

The hollow piston portion 32 may be formed as illustrated in FIG. 3. Notch 34 may have a peripheral somewhat rounded edge 44, as particularly illustrated in FIG. 5. Note the inturned portions 46 which, when the valve member is moved toward closure, will prevent any sharp edge coming in contact with the port seal portions 24b and 26b of the grommet seals. In like manner, the upper or outer edge 48 of notch 34 may be formed in the manner of FIG. 4. Again, there is an in-turned portion 50 which will prevent any sharp edge coming in contact with the port seal portions of the grommet seals. Within piston 32 there may be a slanted interior wall 52 which forms the rear wall of the notch and is adapted to direct water flowing inwardly through the sleeve ports in an axial outward direction along stem assembly 42 toward sleeve outlet ports 16 and 18.

In operation, the closed position of the valve is illustrated in FIG. 1. Note that the grommet seals 24 and 26 are in sealing contact with the exterior cylindrical surface of piston 32. Note also that cylindrical portion 40 of the valve member has closed sleeve outlet ports 16 and 18. The full open position of the valve is illustrated in FIG. 2. Piston 32 has been moved, with the stem, to the point where notch 34 is in register with port 12. The valve is rotatable so that the notch may be in register with portions of both ports 12 and 14 so that both hot and cold water may be introduced within the valve. In any event, the grommet seal is in contact with portions of piston 32 adjacent notch 34. Cylindrical portion 40 has moved substantially beyond outlet ports 16 and 18. When the valve is moved toward the closing position of FIG. 3, there will be substantial pressure upon the grommet seals as the valve begins to close. The distance between the closing edge of notch 34 and the inner surface 41 of cylindrical portion 40 is such that surface 41 will completely close outlet ports 16 and 18 just prior to the time that piston 32 completely closes inlet ports 12 and 14. Because there is no rubber type seal at cylindrical portion 40, but only a minimum clearance fit, there may be some leakage at this point, but that is not important. There will be a substantial closure of all flow by the cylindrical portion 40 just prior to closure of the valve member at piston 32. The edge 50 of the upper portion of the notch 48 being in-turned, will not in any way cut or abrade the inner rim of port seal portions 24b and 26b as closure is accomplished. In like manner, in-turned portions 46 of edge 44 of the notch will similarly not provide any sharp edge as the piston moves past the grommet seals toward the closed position of FIG. 1.

In the absence of a reduced pressure caused by cylindrical portion 40 it has been found in prior valve structures that the very high pressure upon the grommet seals just prior to closure will cause the seals to be pushed inwardly toward and in fact into the notch. In such event the actual closure by the upper surface of the notch can in fact cut or nip the seal as described previously resulting eventually in a leaky valve. By effectively reducing the pressure to a minimum level when closure is accomplished, the grommet seal cannot be pushed into the notch. Accordingly, the spacing between cylindrical portion 40, surface 41 and the notch of the piston 32 is highly important as this relationship provides the described early closure, thus reducing the pressure on the grommet seal. In like manner, additional protection against seal damage is provided by in-turned edges at those portions of the notch which contact the grommet seal at closure.

Surface 41 of cylindrical portion 40 has been shown as substantially flat. It is within the scope of the invention to provide serrations or notches at this point to further modulate the water pressure at valve closure. The notches would not extend to such a point that they would permit any substantial flow of water at closure, but they would more gradually diminish the actual closing of the valve by the portion 40.

Whereas the preferred form of the invention has been shown and described herein, it should be realized that there may be many modifications, substitutions and alternations thereto.

The embodiments of the invention in which an exclusive property or privilege is claimed are defined as follows:

1. In a valve having a sleeve with axially spaced inlet and outlet ports, a valve member movable within said sleeve to control flow from said inlet to said outlet port, seal means at said inlet port positioned by said sleeve and extending through said inlet port into sealing contact with said valve member, said valve member having a first portion adjacent said inlet port to control flow therethrough and a second portion adjacent said outlet port to control flow therethrough, said second portion comprising a cylindrical area substantially the same in diameter as the interior area of the sleeve through which it moves, said first and second portions being axially spaced apart a distance such that movement of said valve member toward a closing position causes said second portion to close said outlet port before said first portion closes said inlet portion thereby reducing pressure on said seal means at closure of said inlet port by said first portion.

2. The valve of claim 1 further characterized in that there are a plurality of inlet ports and a plurality of outlet ports in said sleeve, said valve member being both reciprocally and rotatably movable relative to said sleeve to control the flow of fluid from said inlet ports to said outlet ports.

3. The valve of claim 2 further characterized in that said valve member first portion includes a cylindrical area substantially the same in diameter as the interior of said sleeve, with said seal means being in contact with said cylindrical area when said mixing valve is closed.

4. The valve of claim 3 further characterized in that said first portion cylindrical area includes a notch selectively movable into register with said sleeve inlet ports to control the flow of fluid therethrough, that portion of said cylindrical area adjacent said notch having a peripheral area formed and adapted to prevent any tendency to nip said seal member in contact therewith.

5. The valve of claim 4 further characterized in that said peripheral areas have a smooth contour.

* * * * *